United States Patent
Bocca et al.

(10) Patent No.: US 11,385,316 B2
(45) Date of Patent: Jul. 12, 2022

(54) SYSTEMS AND METHODS FOR DETERMINING THE POSITION OF A WIRELESS ACCESS DEVICE WITHIN A VEHICLE

(71) Applicant: Byton North America Corporation, Santa Clara, CA (US)

(72) Inventors: Maurizio Bocca, Sunnyvale, CA (US); Benoit le Bourgeois, San Jose, CA (US)

(*) Notice: Subject to any disclaimer, the term of this patent is extended or adjusted under 35 U.S.C. 154(b) by 0 days.

(21) Appl. No.: 16/565,412

(22) Filed: Sep. 9, 2019

(65) Prior Publication Data
US 2021/0072341 A1 Mar. 11, 2021

(51) Int. Cl.
*G01S 5/02* (2010.01)
*H04B 17/27* (2015.01)
(Continued)

(52) U.S. Cl.
CPC .............. *G01S 5/0289* (2013.01); *G01S 5/02* (2013.01); *G06N 20/00* (2019.01); *H04B 7/0417* (2013.01);
(Continued)

(58) Field of Classification Search
CPC .... H04B 17/318; H04B 17/391; H04B 17/27; H04B 7/0617; H04B 7/0695; H04B 7/0626; H04B 7/0632; H04B 7/0802; G01S 5/02; G01S 2013/468; G01S 19/42; H04W 84/12; H04W 84/18; H04W 4/029; H04W 4/025; H04W 4/80; H04W 4/38; H04W 4/33;
(Continued)

(56) References Cited

U.S. PATENT DOCUMENTS

2004/0189465 A1* 9/2004 Capobianco ............. G08B 1/08
340/539.23
2007/0280167 A1* 12/2007 Olexa ................... G01S 5/0205
370/331
(Continued)

FOREIGN PATENT DOCUMENTS

CN 104464040 A 3/2015
CN 104464040 A 5/2015
(Continued)

OTHER PUBLICATIONS

The International Search Report and Written Opinion of the International Searching Authority for PCT Application No. PCT/CN2020/070328 dated Mar. 27, 2020, 6 pages.
(Continued)

*Primary Examiner* — Fred A Casca
(74) *Attorney, Agent, or Firm* — Womble Bond Dickinson (US) LLP

(57) ABSTRACT

Disclosed is a method and apparatus for locating a wireless access device relative to a vehicle. The method can include receiving, from a wireless access device, a beacon message at each of two or more antennas positioned within a vehicle and determining, based at least in part on the beacon message received at each of the two or more antennas, a position of the wireless access device relative to the vehicle. One or more systems of the vehicle can be configured based at least in part on the determined position of the wireless access device relative to the vehicle.

18 Claims, 9 Drawing Sheets

(51) Int. Cl.

| | |
|---|---|
| *G06N 20/00* | (2019.01) |
| *H04B 17/391* | (2015.01) |
| *H04B 17/318* | (2015.01) |
| *H04L 1/06* | (2006.01) |
| *H04B 7/0417* | (2017.01) |
| *H04W 4/02* | (2018.01) |
| *H04W 64/00* | (2009.01) |
| *H04W 84/12* | (2009.01) |
| *H04W 4/38* | (2018.01) |
| *H04W 4/029* | (2018.01) |
| *H04W 12/63* | (2021.01) |
| *B64C 39/02* | (2006.01) |
| *H04L 5/00* | (2006.01) |

(52) U.S. Cl.
CPC ........... *H04B 17/27* (2015.01); *H04B 17/318* (2015.01); *H04B 17/391* (2015.01); *H04L 1/06* (2013.01); *H04W 4/025* (2013.01); *H04W 4/029* (2018.02); *H04W 4/38* (2018.02); *H04W 12/63* (2021.01); *H04W 64/00* (2013.01); *H04W 84/12* (2013.01); *B64C 39/024* (2013.01); *B64C 2201/146* (2013.01); *H04L 5/0007* (2013.01)

(58) Field of Classification Search
CPC . H04W 64/00; H04W 12/00503; G06N 20/00
See application file for complete search history.

(56) References Cited

U.S. PATENT DOCUMENTS

| | | |
|---|---|---|
| 2013/0259232 A1 | 10/2013 | Petel |
| 2014/0169193 A1 | 6/2014 | Eder |
| 2014/0188309 A1 | 7/2014 | Caratto et al. |
| 2014/0240091 A1 | 8/2014 | Talty et al. |
| 2014/0274013 A1 | 9/2014 | Santavicca |
| 2016/0320469 A1 | 11/2016 | Laifenfeld et al. |
| 2017/0092028 A1 | 3/2017 | Weicker et al. |
| 2017/0105101 A1* | 4/2017 | Santavicca ............ H04B 17/27 |
| 2018/0099643 A1 | 4/2018 | Golsch et al. |
| 2018/0339710 A1 | 11/2018 | Hashimoto |
| 2019/0297592 A1* | 9/2019 | Lindquist ................ H04W 4/33 |
| 2019/0311298 A1 | 10/2019 | Kopp et al. |
| 2019/0312878 A1* | 10/2019 | Brown ................ H04L 63/0823 |
| 2019/0336096 A1* | 11/2019 | Itu .......................... A61B 34/10 |
| 2020/0005566 A1 | 1/2020 | Jain et al. |
| 2020/0070777 A1 | 3/2020 | Chen et al. |
| 2020/0216025 A1 | 7/2020 | Le Bourgeois et al. |

FOREIGN PATENT DOCUMENTS

| | | |
|---|---|---|
| CN | 104918212 A | 9/2015 |
| CN | 107074281 A | 8/2017 |
| WO | 2018024399 A1 | 2/2018 |
| WO | 2018059725 A1 | 4/2018 |
| WO | 2020140983 A1 | 7/2020 |

OTHER PUBLICATIONS

The First Office Action for U.S. Appl. No. 16/240,461 dated Jun. 8, 2020, 29 pages.

The Second Office Action for U.S. Appl. No. 16/240,461 dated Nov. 3, 2020, 28 pages.

The Third Office Action for U.S. Appl. No. 16/240,461 dated Feb. 17, 2021, 25 pages.

The Written Opinion for counterpart PCT Application No. PCT/CN2020/070328 dated Mar. 27, 2020, 3 pages.

* cited by examiner

SYSTEMS AND METHODS FOR DETERMINING THE POSITION OF A WIRELESS ACCESS DEVICE WITHIN A VEHICLE

FIELD

The disclosed embodiments relate generally to vehicle systems and in particular, but not exclusively, to enabling and/or configuring vehicle systems based on the detected position of a wireless access device relative to the vehicle.

BACKGROUND

Vehicles, such as cars, trucks, trains, etc., generally include a sizeable interior volume within which passengers may reside during a trip. The interior of any vehicle may include seats, doors, and other systems which may create spaces where objects can be lost. For example, vehicle occupants can lose their phones or other smart devices under a seat, or forget them in a door cubby. Typically, such smart devices and the vehicle are in continuous communication with each other so as to allow for smart phone connectivity (e.g., for hands free calling, displaying map data on a vehicle screen, using a WiFi hotspot generated by the vehicle to connect to the internet and so on). Current systems for position determination utilize a one to one ratio of transceivers to antennas when obtaining signals for use in position determination. However, such systems require significant hardware resources and may be more complex to implement.

The interior of any vehicle may include seats, doors, and other systems which may be configurable based on the occupants of the vehicle. For example, a driver may adjust the seat position, rearview mirror position, cabin climate settings, and other settings based on his/her preferences. In addition, each passenger may be able to personalize settings for certain systems depending on where in the vehicle they are located. For example, a front seat passenger may have control over seat position, cabin climate (e.g., in a vehicle with dual-zone climate control or similar), and window preferences while a back seat passenger may have access to window and entertainment system preferences. However, in many cases, each passenger must manually adjust the settings for each applicable system to their own preferences before the beginning of a journey. In addition, if passengers and/or the driver switch places during the journey, or at the outset of a subsequent journey, then each passenger as well as the new driver must readjust the settings for each applicable system to their preferences. This process may be cumbersome and time consuming.

DETAILED DESCRIPTION

Figure 1A:
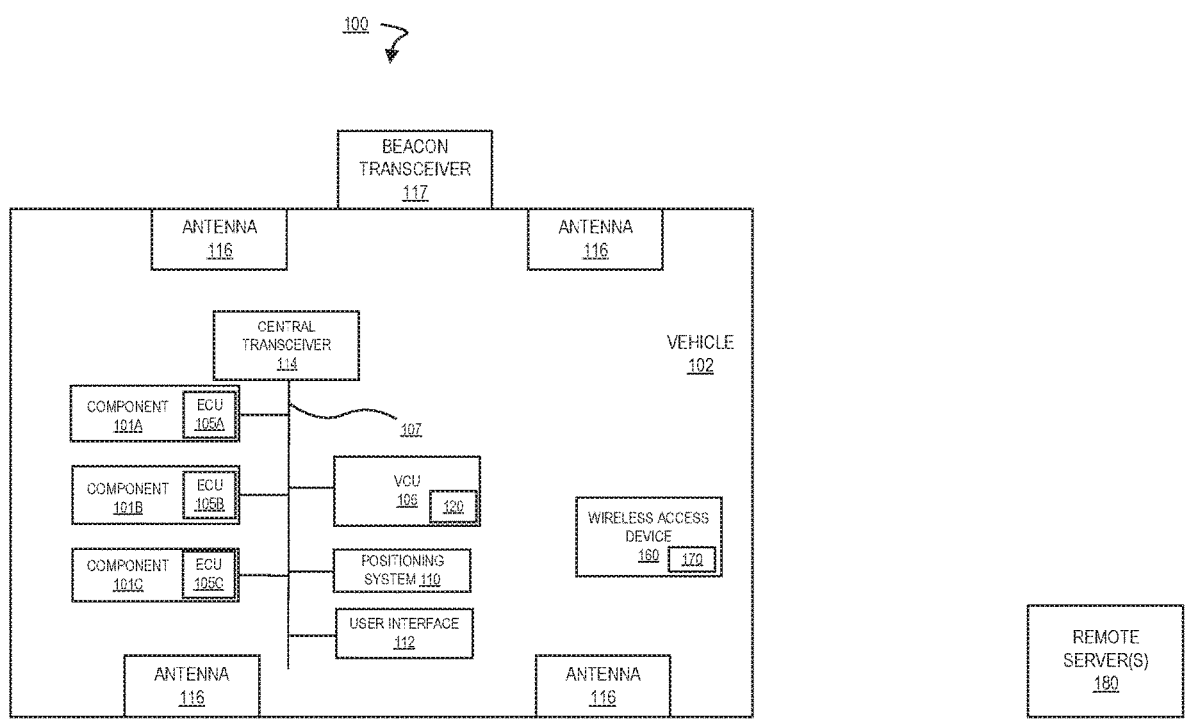
FIG. 1A is a block diagram of an exemplary system architecture for determining a position of a wireless access device relative to a vehicle.

The word "exemplary" or "example" is used herein to mean "serving as an example, instance, or illustration." Any aspect or embodiment described herein as "exemplary" or as an "example" in not necessarily to be construed as preferred or advantageous over other aspects or embodiments.

FIG. 1 is a block diagram of an exemplary system architecture 100 for determining the position of a wireless access device 160 relative to a vehicle 102. System 100 implements a method for determining the position of a wireless access device 160 relative to a vehicle 102 based on reception of beacon messages generated by wireless access device 160, and received by a plurality of antennas 116 of the vehicle 102. For some embodiments, one or more systems of the vehicle, such as an entertainment system, doors, a trunk, windows, etc. may be configured based on the determined position of the wireless access device 160 within the vehicle 102 (e.g., based on one or more configurations associated with the determined position the determined position). These, and other embodiments, will be discussed in greater detail herein.

In embodiments, vehicle 102 may be a fully electric vehicle, partially electric (i.e., hybrid) vehicles, non-electric vehicles (i.e., vehicle with a traditional internal combustion engine). Furthermore, although described mostly in the context of automobiles, the illustrated systems and methods can also be used in other wheeled vehicles such as trucks, motorcycles, buses, trains, etc. It can also be used in non-wheeled vehicles such as ships, airplanes (powered or gliders), and rockets. In fact, the illustrated embodiments can be used in any situation in which it is useful to know the position of a wireless access device relative to a vehicle. Additionally, embodiments discussed herein may also be used to control access to other systems (e.g., unlock and/or open residential or commercial doors), configure lighting systems (e.g., turn on exterior and/or interior lights), or any other system that can utilize secure authenticated micro localization to control its operation.

In embodiments, wireless access device 160 is a hardware device capable of wirelessly transmitting and receiving data, and performing authentication and beacon message transmission processes, as discussed in greater detail herein. In embodiments, however, wireless access device 160 may be any wireless device with a transceiver, memory, and processor configured to perform the processes discussed herein. For example, a smartphone, smart watch, wearable device, tablet computer, or other wireless device may be configured to perform the functions of wireless access device 160, such as by execution of application 170 associated with a manufacturer of vehicle 102. In other embodiments, wireless access device 160 can be a purpose built device, such as a credit card sized, key chain sized, etc. device having communication capabilities (e.g., Bluetooth, Bluetooth Low Energy, wireless local area network (WLAN), etc. communication capabilities), processing capabilities (e.g., a microprocessor), a power source (e.g., a coin cell battery or other battery capable of powering the purpose built device, and in some embodiments providing long battery life, such as 2 or more years), one or more user interface elements for activating the device (e.g., a button, a switch, etc. that can be used by a user to turn on the card for performing processes discussed herein), and memory resources (e.g., a local storage), and being capable of performing the techniques discussed herein independently, or when paired with another device (e.g., a smartphone). Furthermore, each of these wireless access devices for accessing vehicle may be used in conjunction with one another (e.g., so that notifications, such as low battery of an access device communicated in a beacon message or other wireless message, may generate notifications to other device(s), prompt battery charging or replacement, prompt a user to select among available entry device(s) etc.), or separately, for example as a backup (e.g., a key fob or mobile device's battery has died), for providing to a valet (e.g., providing limited access and use to vehicle), etc. However, to avoid obscuring embodiments of the present invention, the remainder of the present disclosure will refer to a wireless access device 160.

In embodiments, wireless access device 160 may be water resistant to provide continuous use in inclement weather, when dropped in a puddle, etc., and may also include a physical key for providing access to vehicle 102 via a corresponding key cylinder of the vehicle 102, for example during an emergency, in response to a dead battery of key fob, by a user uncomfortable with wireless entry systems, etc.

Figure 1B:
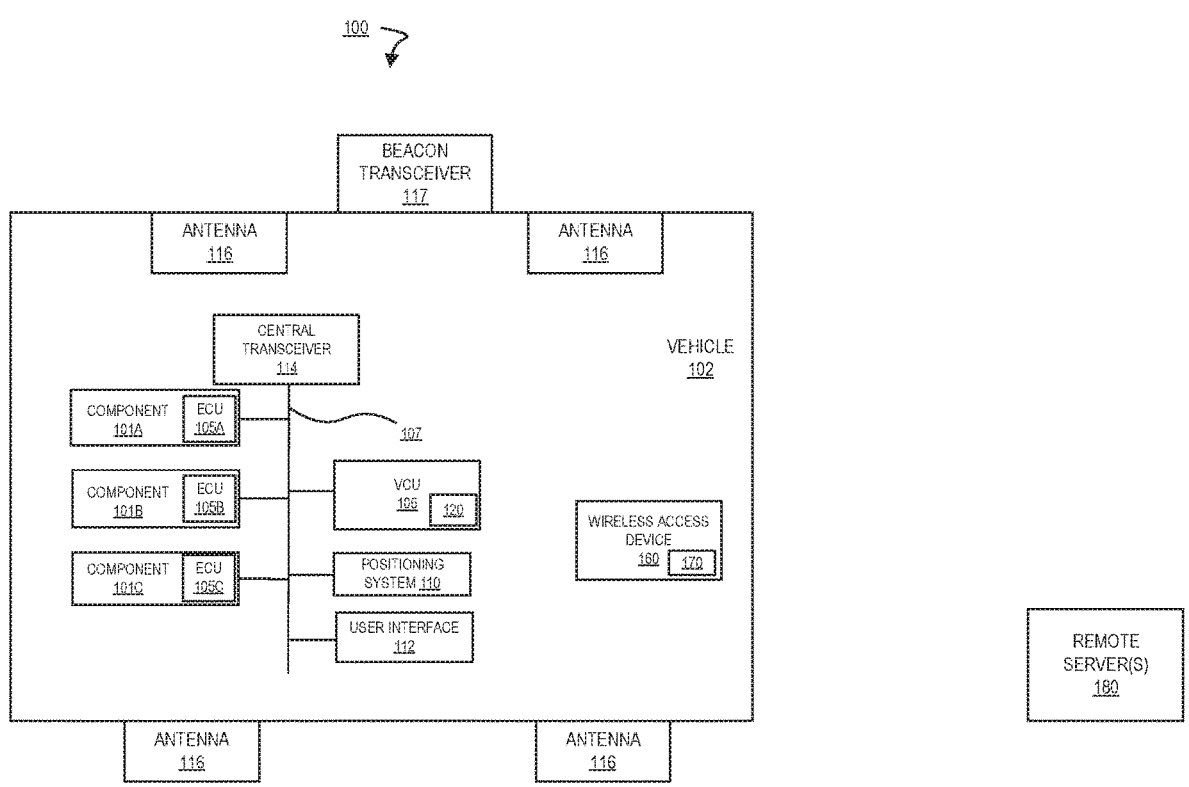
FIG. 1B is a block diagram of an exemplary system architecture for determining a position of a wireless access device located outside or within a vehicle.

In one embodiment, vehicle 102 includes one or more systems, such as components 101, each having an electronic control unit (ECU) 105, and each ECU 105 is communicatively coupled via a communications network 107 to a vehicle control unit (VCU) 106. The communications network 107 may be a controller area network (CAN), an Ethernet network, a wireless communications network, another type of communications network, or a combination of different communication networks. VCU 106 is also communicatively coupled to a positioning system 110 (e.g., a satellite navigation system), a user interface 112 and central transceiver 114, through which vehicle 102 can wirelessly transmit data to, and receive data from, wireless access device 160, as well as other systems (e.g., LAN access points, WAN access points, other vehicles, security servers, remote maintenance systems, etc.). In embodiments, each antenna 116 is communicably coupled with transceiver 117. Although illustrated as being located on the inside of the vehicle 100 in FIG. 1A, one or more of the antennas 116 may be located on the exterior of vehicle 100 as illustrated in FIG. 1B to allow for detection of the position of wireless access devices both inside and outside the vehicle. Although illustrated as being coupled to an exterior side of the vehicle 102 in FIG. 1A, transceiver 117 may be coupled to any appropriate part of the exterior or the interior of the vehicle 102. Each antenna 116 may be communicatively coupled to the transceiver 117 using existing wired communications links of vehicle 102. By using a single transceiver 117 to switch between and process signals from each antenna 116 (as discussed in further detail herein), as opposed to a one to one ratio between transceivers and antennas, embodiments of the present disclosure may realize significant savings in equipment cost. In other embodiments, each antenna 116 may be coupled to the transceiver 117 via a wireless communication link for transmitting and receiving wireless messages in a personal area network, such as a Bluetooth™, Bluetooth™ low energy (BLE), Zigbee, or other wireless personal area network, consistent with the discussion herein. The transceiver 117 may function to convert analog signals received from antennas 116 into digital signals and forward the digital signals to the central transceiver 117. For example, transceiver 117 may convert an analog signal corresponding to the measured signal strength of a beacon message received by the antenna 116A from wireless access device 160 into a digital signal and transmit the digital signal to the VCU 106 via the central transceiver 114. Transceiver 117 may also function to select (e.g., switch) between antennas 116. For example, transceiver 117 may include a selector (not shown) which may couple the transceiver 117 to a selected antenna 116 as directed by a processor (not shown) of the transceiver 117 to switch between antennas 116. In embodiments, transceiver 117 may be a multiple input multiple output (MIMO) transceiver that may omit the selector and take input from all of the antennas 116 in parallel, without the need to switch between antennas 116. Transceiver 117 may be communicably coupled to central transceiver 114 via a wired or wireless communications link for transmitting and receiving messages, as discussed herein. For example, transceiver 117 may communicate with central transceiver 114 via the communications network 107. The antennas 116 may be distributed throughout an interior of vehicle 102. For example, there may be a plurality of antennas 116 distributed at different positions of the vehicle 102, such as two in a rear of the vehicle (e.g., adjacent to the back windshield) and two in a front of the vehicle 102 (e.g., adjacent to the front windshield) as illustrated in FIG. 1A. However, for some embodiments, antennas 116 may be placed behind or within a non-interfering material, such as behind interior paneling, to hide and protect the interior antennas 116 from view of vehicle occupants. In some embodiments, as described and illustrated herein, the arrangement of antennas 116 within the vehicle 102 enables improved position determination of wireless access device 160 within the vehicle. Although illustrated in FIG. 1A with 4 antennas, any appropriate number of antennas may be used.

Components 101 are generally systems of the vehicle 102. For example, components 101 can include adjustable seat actuators, power inverters, window electronic control unit, entertainment systems, electronic control unit for braking systems, etc. Vehicle control unit (VCU) 106 is a controller including a microprocessor, memory, storage, and a communication interface with which it can communicate with components 101, positioning system 110, user interface 112 and central transceiver 114, via network 107. In embodiments, central transceiver 114 and transceiver 117 may also communicate wirelessly with one another and/or VCU 106 using, for example, a local or personal area wireless network connection. In one embodiment VCU 106 is the vehicle's main computer, but in other embodiments it can be a component separate from the vehicle's main or primary computer.

In one embodiment, VCU 106 includes a vehicle configuration manager 120 that is used for vehicle-side management of configuring various systems of vehicle 102 (e.g., unlocking doors, opening a trunk, rolling down windows, starting a vehicle ignition, authorizing vehicle operation, etc.) based at least in part on a determined position of wireless access device 160 within vehicle 102, as discussed in greater detail below. Similarly, wireless access device 160 also includes a device access manager 170 for device-side management and controlling messaging of wireless access device 160 with vehicle 102, as discussed in greater detail below. The vehicle and device managers 120 and 170 may be software executed by respective processors of vehicle 102 and wireless access device 160, or may be hardware (circuitry, dedicated logic, etc.), firmware, or a combination. Furthermore, the vehicle and device managers 120 and 170 may each be configured to execute secure encryption protocols, such as advanced encryption standard (AES) encryption protocols including AES128 encryption, authenticated encryption protocols, such as CCM mode of AES, GCM mode of AES, etc., as well as other encryption protocols during the exchange of wireless messages to ensure the privacy of the content within the messages. The usage of such encryption protocols and techniques in authenticating wireless access device 160 to vehicle 102 ensures that the encryption techniques used are trusted, known to be secure, and provide the ability to safeguard the data that has been encrypted and exchanged wirelessly between the vehicle 102 and wireless access device 160. Other encryption protocols may be used by vehicle and device access managers 120 and 170 in accordance with the discussion herein, for example, using message authentication code (MAC) tags for encrypted messages to provide message and content authentication, adding nonce data to encrypted messages (e.g., arbitrary random numbers prepended to an encrypted message payload and used only once during cryptographic message exchange to ensure message freshness, to prevent replay attacks, and to serve as an initialization vector or nonce for the encryption process itself), etc.

In embodiments, wireless access device 160 initially communicates a wireless signal to vehicle 102. In embodiments, it is assumed that wireless access device 160 has previously completed an enrollment process that, for example, has authenticated (e.g., paired and/or bonded) wireless access device 160 to vehicle 102, has provided one or more identifiers of wireless access device 160 and/or user(s) of wireless access device 160, as well as other data that is used by vehicle 102 to authenticate and identify wireless access device 160 as an authorized device for access and operation of vehicle 102. In embodiments, the wireless message transmitted from wireless access device 160 is transmitted by device access manager 170 in response to a user pressing a button, selecting an application user interface element, initiating a motion gesture command, etc.

Central transceiver 114 receives the wireless message. Initially, central transceiver 114 and wireless access device 160 may perform an authentication process to, for example, exchange identifiers, establish session keys, negotiate encryption keys, establish wireless communication protocol parameters, and otherwise authenticate wireless access device 160 to vehicle 102 as an authorized device for accessing and/or operating vehicle 102 if such an authentication process has not been performed already. In embodiments, central transceiver 114 is the main transceiver that controls the transceiver 117. Furthermore, transceiver 117 may remain in an inactive state until woken by central transceiver 114. Therefore, in response to receiving the wireless message from wireless access device 160 and successfully authenticating wireless access device 160, central transceiver 114 activates transceiver 117, such as by causing the transceiver 117 to transition to an active mode in which it is configured to receive beacon messages from antennas 116.

In embodiments, and further in response to successfully authenticating wireless access device 160, vehicle access manager 120 then transmits via central transceiver 114, a request for wireless access device 160 to transmit one or more beacon messages. The beacon messages may be transmitted wirelessly by wireless access device 160 periodically. Furthermore, the beacon messages may include a header that identifies the message, and a payload carrying data, such as wireless access device and/or user identifiers, battery data, command data, signal transmit power, any known position data, etc. Furthermore, as discussed herein, the beacon message may encrypt sensitive information prior to transmission based on a negotiated encryption protocol and/or keys.

In embodiments, each antenna 116 may receive the beacon message transmitted by wireless access device 160 and measure one or more physical parameters of the received beacon messages. For example, each antenna may measure signal data such as signal strength, time of flight, phase, angle of arrival, angle of departure, and polarization of the received beacon message. Each antenna 116 may forward the beacon message including any additional data (e.g., measured physical parameters) to transceiver 117. Transceiver 117 may receive the beacon messages as analog signals and may convert the analog signals received from each antenna 116 to digital signals representing the beacon messages and forward the (now digitized) beacon messages to the central transceiver 114. As discussed herein, transceiver 117 may switch between antennas 116 and receive the beacon messages one by one from each respective antenna 116. In embodiments, transceiver 117 may be a MIMO transceiver and may receive the beacon messages from each antenna 116 simultaneously. The central transceiver 114 may forward the beacon messages to the VCU 106 which may extract, from each beacon message, signal data such as transmit signal strength, received signal strength at the antenna 116, identifiers, time of flight, phase, angle of arrival, angle of departure, and polarization, and use one or more of the signal data measurements to determine a position of the wireless access device 160, as discussed in further detail herein. Although the embodiments of the present disclosure describe determining position using received signal strength of the beacon messages, any one or more of the above discussed parameters may be used.

In some embodiments, vehicle access manager 120 extracts, from each beacon message received via central transceiver 114, signal data, such as transmit signal strength, identifiers and received signal strength at the antenna 116 the beacon message was received at etc. Then, based on the extracted data, vehicle access manager 120 performs a positioning process to determine a position of wireless access device 160 within the vehicle 102. For example, the position may be a position relative to the vehicle (e.g, inside, outside the vehicle), a position relative to a component or part of the vehicle, a range/distance from a relative position, or a position in a particular zone of the vehicle as discussed in further detail herein. In embodiments, the position determination can be based on, for example, which antennas 116 receive the strongest beacon message (e.g., wireless access device 160 is determined to be located near the antennas 116 that receive the strongest signal), trilateration, triangulation, or multi-lateration based on received signal strengths, pattern recognition by a machine learning model (trained using known transmission positions and received signal data as discussed in greater detail below), other position determination techniques (e.g., tend, sorted table, and/or token based techniques), or a combination of methods. For example, a combination of positioning techniques may be used with one another (e.g., using relative strength of receives signals as a cross-check with a machine learning model based position determination). Additionally, real world machine learning model training data may be generated by vehicle access manager when, for example, a machine learning model based position determination differs from another position determination (e.g., measuring relative signal strengths of received messages as discussed in greater detail below with respect to FIGS. 6A and 6B).

In any embodiment, vehicle access manager 120 may utilize a determined identity of a user/device seeking access (e.g., is user/device associated with driving authorization that may be granted to a vehicle owner, is user/device associated with access but no driving authorization such as that which may be granted to a child of the vehicle owner, etc.) along with the detected position of the wireless access device to selectively configure different vehicle systems. That is, a determined position of a wireless access device associated with operational permission may enable the startup and/or configuration of various systems of the vehicle 102 including the driving system. By contrast, a determined position of a wireless access device associated with non-operational permission may only permit turning on and operation of entertainment systems, etc. In embodiments, the configuration can include some or all of the following operational permissions: unlocking doors, opening doors, unlocking a trunk, unlocking a charging port cap, opening/closing windows, turning on and operating entertainment systems, activating or tuning heating ventilation and air-conditioning settings to user preferences, closing or opening windows, adjusting seat settings, dashboard settings, selectable vehicle options as well as many other vehicle configurations that may be initiated by, and associated with, an authenticated user.

In embodiments, determined positions of wireless access device 160 and the signal measurements (e.g., from beacon messages received by VCU 106 from antennas 116) used in making the position determinations, are transmitted to remote server(s) 180. In embodiments, a transceiver of vehicle 102, such as central transceiver 114 or other transceiver, communicably couples vehicle 102 to remote server(s) 180 over, for example a wide area network, a telecommunications network, a local area network, or a combination of networks. In embodiments, remote server(s) 180 can collect the position determination and signal data used in making the position determinations as, for example, training data for refining a machine learning model that is used by a plurality of vehicles (e.g., vehicles of a manufacturer being of the same model and/or model year such that physical properties the vehicles and transceiver placement is the same), adjust thresholds based on multiple user/vehicle experience and feedback, etc. In response to MLM refinement, threshold adjustments, signal strength measurement analysis adjustments, etc., remote server(s) 180 may distribute updates to vehicle 102 as well as other vehicles.

Figure 2:
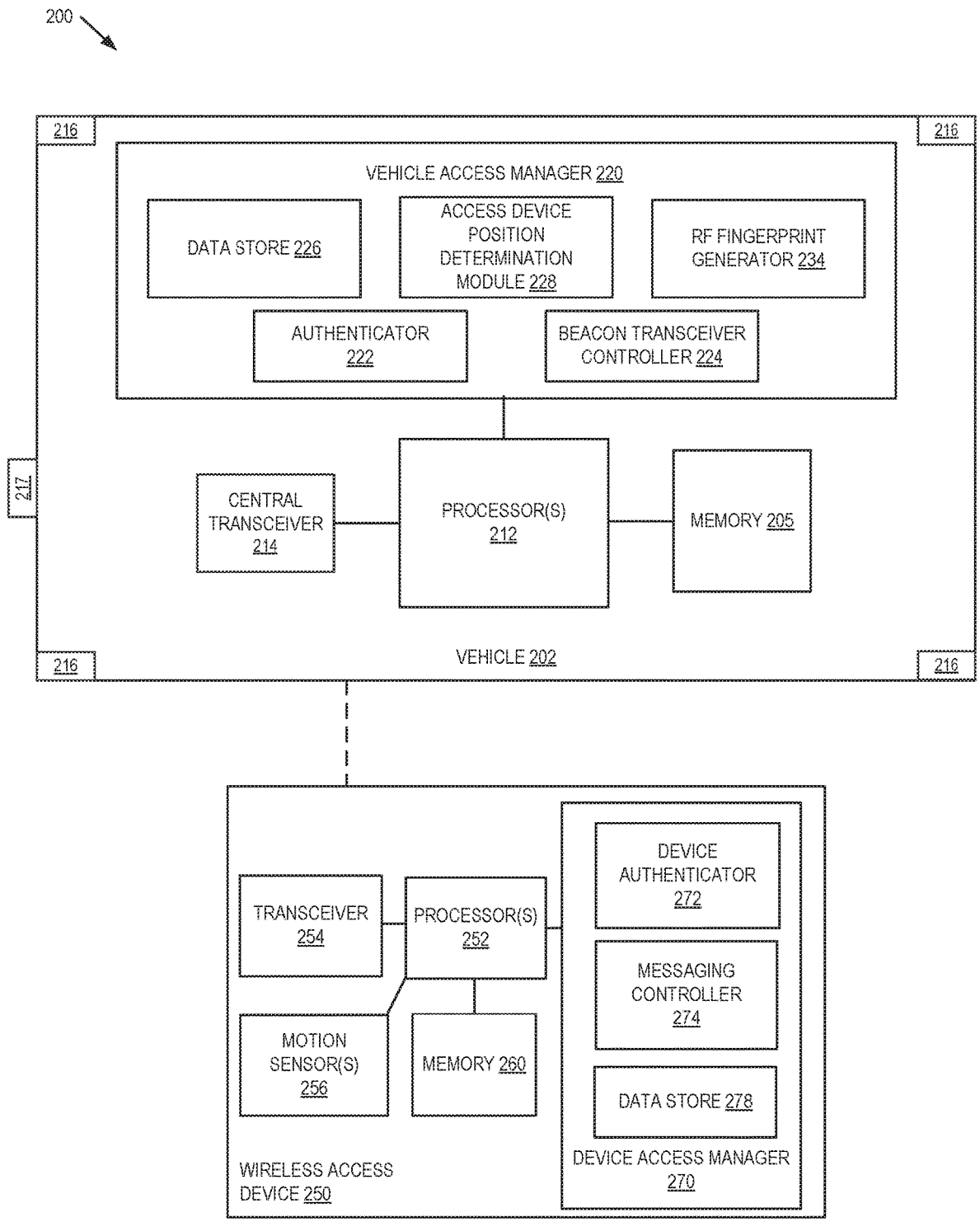
FIG. 2 is block diagram of one embodiment of a system including a vehicle and a wireless access device in communication with one another.

FIG. 2 is block diagram of one embodiment of a system 200 including a vehicle 202 and a wireless access device 250. Vehicle 202 and wireless access device 250 provide additional details for vehicle 102 and a wireless access device 160 discussed above in FIG. 1.

In one embodiment, vehicle 202 is a system, which may include one or more processor(s) 212, a memory 205, a central transceiver 214, a plurality of antennas 216, and a transceiver 217. In embodiments, transceiver 217 is a wired or wireless personal area network transceiver, such as a Bluetooth, BLE, Zigbee, or other personal area network transceiver. It should be appreciated that vehicle 202 may also include, although not illustrated, a user and/or hardware interface, vehicle controls, one or more power device(s) (e.g., vehicle battery, drive control system, one or more vehicle systems (e.g., VCUs, positioning systems, etc.) etc.), a propulsion system (e.g. an electric, gasoline, etc. powered motor), a steering system, a braking system, as well as other components typically associated with vehicles. It is to be understood that vehicle 202 may include a separate network interface (not shown) that may be capable of communicatively coupling vehicle 202 to any number of wireless subsystems (e.g., Bluetooth, WiFi, Cellular, or other networks), internal vehicle communication networks (e.g., a CAN bus, an Ethernet network, a wireless network, etc.) to transmit and receive data streams through one or more communication links.

In one embodiment, wireless access device 250 is also a wireless device, which may include one or more processor(s) 252, a memory 260, one or more motion sensor(s) 256 (e.g., one or more of an accelerometer, gyroscope, inertial measurement unit, etc.), and a transceiver 254. In embodiments, transceiver 254 is also a personal area network transceiver, such as a Bluetooth, BLE, Zigbee, or other personal area network transceiver. It should be appreciated that wireless access device 250 may also include, although not illustrated, a user interface (e.g., keyboard, touch-screen, buttons, or similar devices), a power device (e.g., a battery), a display screen (e.g., an LCD display), as well as other components typically associated with wireless devices. As discussed above, wireless access device 250 may be implemented using a purpose built device (e.g., a key fob, an access card, etc.), or using the hardware and processing resources of a mobile computing system (e.g., a smart phone, a wearable device, etc.), as well as using other wireless devices with sufficient hardware and/or software capabilities for performing the processes discussed herein.

In embodiments, the memories (e.g., memory 205 and memory 260) of vehicle 202 and wireless access device 250 may be coupled to processor(s) to store instructions for execution by the processors, such as processor (s) 212 and processors 252. In some embodiments, the memory is non-transitory, and may store one or more processing modules. In one embodiment, memory 205 of vehicle 202 may store one or more processing modules of a vehicle manager 220, such as an authenticator 222, transceiver controller 224, data store 226, and an access device position determination module 228 to implement embodiments described herein. Furthermore, memory 260 of wireless access device 250 may also include a device access manager 270, including a device authenticator 272, transceiver controller 274, and data store 278.

It should be appreciated that the embodiments as will be hereinafter described may be implemented through the execution of instructions, for example as stored in memory or other element, by processor(s) and/or other circuitry of vehicle 202 and wireless access device 250. Particularly, circuitry of vehicle 202 and wireless access device 250, including but not limited to processor(s) 212 and processor(s) 252 may operate under the control of a program, routine, or the execution of instructions to execute methods or processes in accordance with the aspects and features described herein. For example, such a program may be implemented in firmware or software (e.g. stored in memory 205 and/or memory 260) and may be implemented by processors, such as processor(s) 212 and processor(s) 252, and/or other circuitry. Further, it should be appreciated that the terms processor, microprocessor, circuitry, controller, etc., may refer to any type of logic or circuitry capable of executing logic, commands, instructions, software, firmware, functionality and the like.

In one embodiment, wireless access device 250 includes device authenticator 272 for engaging in an authentication process with authenticator 222 of vehicle 202. For example, the authentication process can include exchanging encryption keys, identifiers, performing attestation, negotiating a connection, etc. for wireless communications between vehicle 202 and wireless access device 250. The authentication process verifies that the wireless access device 250 and/or a user associated with the wireless access device is authorized to operate the vehicle (e.g., by matching authorized device/user identifiers stored in data store 226), and further enables vehicle access manager 220 to obtain specific configuration settings for unlocking doors, providing operational control, etc. from data store 226.

In response to the authentication process being completed, where the wireless access device 250 is verified as an authorized device and/or associated with an authorized user, transceiver controller 224 activates transceiver 217. To preserve power, transceiver 217 may enter a low power state when not actively used, and activation includes waking the transceiver. Furthermore, transceiver controller 224 instructs the transceiver 217 to receive beacon message(s) transmitted from antennas 216. The beacon message(s) may be transmitted to the antennas 216 from the authenticated wireless access device 250. Additionally, transceiver controller 224 further sends a request via central transceiver 214 to the transceiver 254 of wireless access device 250 for wireless access device to begin sending beacon messages. By activating the transceiver 217, and requesting that wireless access device 250 generate and transmit beacon messages, the wireless access device 250 positioning and vehicle configuration processes are initiated.

In response to the request, messaging controller 274 of device access manager 270 generates one or more beacon messages that are transmitted by transceiver 254. In one embodiment, the beacon messages include various data, such as device and/or user identifiers, transmit signal strength, positioning data (e.g., GPS data), as well as other data.

Each of the antennas 216 receive the beacon message(s) transmitted by wireless access device 250, and measure signal data, such as signal strength, of the received beacon message. Each antenna 116 may forward the beacon message including any additional data (e.g., measured signal strength upon reception) to transceiver 217. Transceiver 217 may receive the beacon messages as analog signals and may convert the analog signals received from each antenna 116 to digital signals (using e.g., any appropriate analog to digital conversion method) and perform additional signal processing before transmitting the (now digitized) beacon messages to processor(s) 212 (e.g., via central transceiver 214). As discussed herein, transceiver 217 may switch between antennas 216 and receive the beacon messages one by one from each respective antenna 216. In embodiments, transceiver 217 may be a MIMO transceiver and may receive the beacon messages simultaneously. The central transceiver 214 may forward the beacon messages to the processor(s) 212 which may extract signal data (e.g., received signal strength) from each beacon message, and use the received signal strength measurements to determine a position of the wireless access device 250, as discussed in further detail herein. Although discussed in terms of received signal strength, any one or more suitable physical parameters of the beacon messages such as time of flight, phase, angle of arrival, angle of departure, and polarization of the received beacon message may be utilized for the position determination. More specifically, the processor(s) 212 may extract characteristics associated with the beacon message(s), such as received signal strength or RSSI. The messages and any extracted data are then forwarded to access device position determination module 228 via central transceiver 214. Access device position determination module 228 may then perform one or more position determination processes. For example, determining which antennas 216 report the highest received signal strength enables access device position determination module 228 to determine a position of the wireless access device 250 as being located somewhere between those antennas within the vehicle, as discussed in great detail below with respect to FIGS. 6A-6B. In embodiments, access device position determination module 228 may use trilateration, triangulation, or multi-lateration or any other appropriate method for determining the position relative to the vehicle of the wireless access device 250 based on the received signal strength of the beacon message at each antenna 216. In embodiments, access device position determination module 228 can further utilize a trained machine learning model, such as a long short-term memory machine learning model, based analysis to detect, for example, a point position of wireless access device relative to the vehicle. In embodiments, the machine learning model is trained (e.g., during vehicle testing, as part of vehicle manufacture, for vehicle 202, etc.) by generating beacon messages at known positions with the vehicle, and iteratively feeding reception characteristics into the machine learning model until predictions from the model satisfy an accuracy requirement (e.g., position accuracy+/−X meters, relative distance accuracy+/−Y meters from a component of the vehicle, etc.). The training of the machine learning model is discussed in greater detail below with reference to FIGS. 5A-5B.

In embodiments, a combination of the position determination techniques described herein may be used by access device position determination module 228. For example, a position determination technique including the determination of which subset of antennas receives the strongest signals (e.g., the technique described in FIGS. 6A and 6B) may be used as a cross check to a machine learning model based position determination. As another example, training data may be generated when a machine learning model position determination does not agree, or when it does agree, with another position determination technique. In embodiments, training data may be shared with remote systems (e.g., remote server(s) 180) so that refinement of position determination techniques can be performed over time and as training data/positioning determinations are performed by vehicles of a manufacturer, so that the refinements can be re-distrusted to appropriate vehicles of a manufacturer to further improve position determination of wireless access devices.

In embodiments, vehicle access manager 220 then configures one or more vehicle systems (e.g., doors, windows, trunk, hood, charging port door, etc.) based in part on the determined position of wireless access device 250. That is, based on a determined position of wireless access device 250, vehicle access manager may automatically configure vehicle systems (e.g., activating passenger side air conditioning, unlocking a driver side door, etc.). In another embodiment, the vehicle configuration may be based on the determined position as well as a user command received from the wireless access device (e.g., a button press, a user interface selection, a motion gesture command, or a combination thereof).

Furthermore, these beacon messages can be generated and measured successively over time. Furthermore, when used in combination, the position determination at one time may be verified or cross-checked against the measurements gathered by wireless access device 250 and/or vehicle 202, at the same or different times, to improve the determination of position of the wireless access device 250 relative to vehicle 202 and to guard against erroneous or inaccurate position determinations, should they occur.

Figure 3:
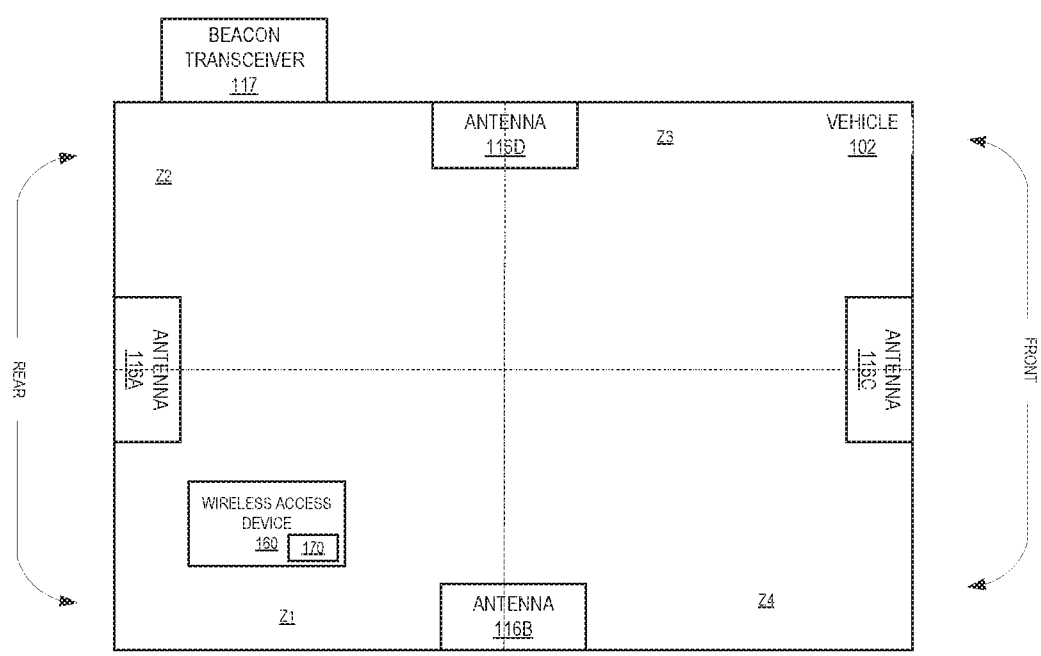
FIG. 3 is a diagram of a vehicle divided into zones.

FIG. 3 illustrates a block diagram of the vehicle 102 (illustrated in FIG. 1A) in accordance with some embodiments of the present disclosure. As shown in FIG. 3, the vehicle 102 may be divided into a plurality of zones Z1-Z4. In some embodiments, each of the antennas 116 may be positioned such that the pathways between antennas (illustrated with dashed lines in FIG. 3) define the zones that the vehicle 102 is divided into as understood by the VCU 106 (shown in FIG. 1A). VCU 106 may understand certain combinations of signal strength measurements as corresponding to a particular zone. For example, if the signal strength of the beacon message received at antennas 116A and 1166 exceeds the strength of the signals received at antennas 116C and 116D, VCU 106 may determine that wireless access device 160 is within zone Z1. The exact position within Z1 may be determined by using a trilateration, triangulation, or multi-lateration (or other) analysis of the signal strength of the beacon message received at each antenna 116. FIG. 3 illustrates vehicle 102 divided into 4 equal rectangular zones Z1-Z4 for ease of illustration, and vehicle 102 may be divided into any appropriate number and size of zones. In some embodiments, the zones may be different sizes.

Generally, the wireless access device 160 will show greater received signal strength at the antennas 116A and 116B in the same zone (e.g. zone Z1 in FIG. 3) in which the wireless device 160 is located, and lower received signal strength at antennas 116C and 116D in other zones (e.g., zones Z2, Z3 and Z4) in which the wireless device 160 is not located. Various algorithms are readily devised for this endeavor, with the goal of detecting a location of the wireless device 160 in a zone in the interior of the vehicle 102.

The system can then communicate with and direct one or more of the automotive systems for a personalized user experience. For example, upon detecting a wireless device 160 in zone Z1, the rear right zone of the vehicle 102, or nearer to antennas 116A and 1166 than to other antennas 116, the system could direct a personal audio greeting from an audio speaker (not shown), or activate and show a personal video greeting (e.g., a message, image or video) from a view screen (not shown) in zone Z1 of the vehicle 102. Other examples of personalizing would be to have the system direct to play a favorite song through the speaker in Z1 or all of the speakers in the vehicle 102, adjust equalization or left-right or front-rear balance of speakers, offer or start play of a favorite videogame on the view screen of Z1 or show favorite images or website, etc. Other vehicle systems could be involved, such as heating ventilation and air-conditioning activated or tuned to user preferences, windows opened or closed, seat adjustments, dashboard settings, selectable vehicle options and so on.

For some embodiments, the system detects an identifier (ID) of the wireless device 160, and looks up user preferences or settings accordingly. For example, upon detecting presence of a wireless device and location of the wireless device in the driver zone (Z3), the system could determine an ID of the wireless device 160 and look up driver preferences for seating, suspension settings, even engine control or transmission shifting settings, communicating or directing these of various vehicle systems. The system could bring up user presets on a view screen in a selected zone for favorite radio stations or settings for vehicle systems according to the ID of the wireless device 160 located in that zone. Further personalized experiences are readily envisioned and directed by the system in further embodiments.

Figure 4:
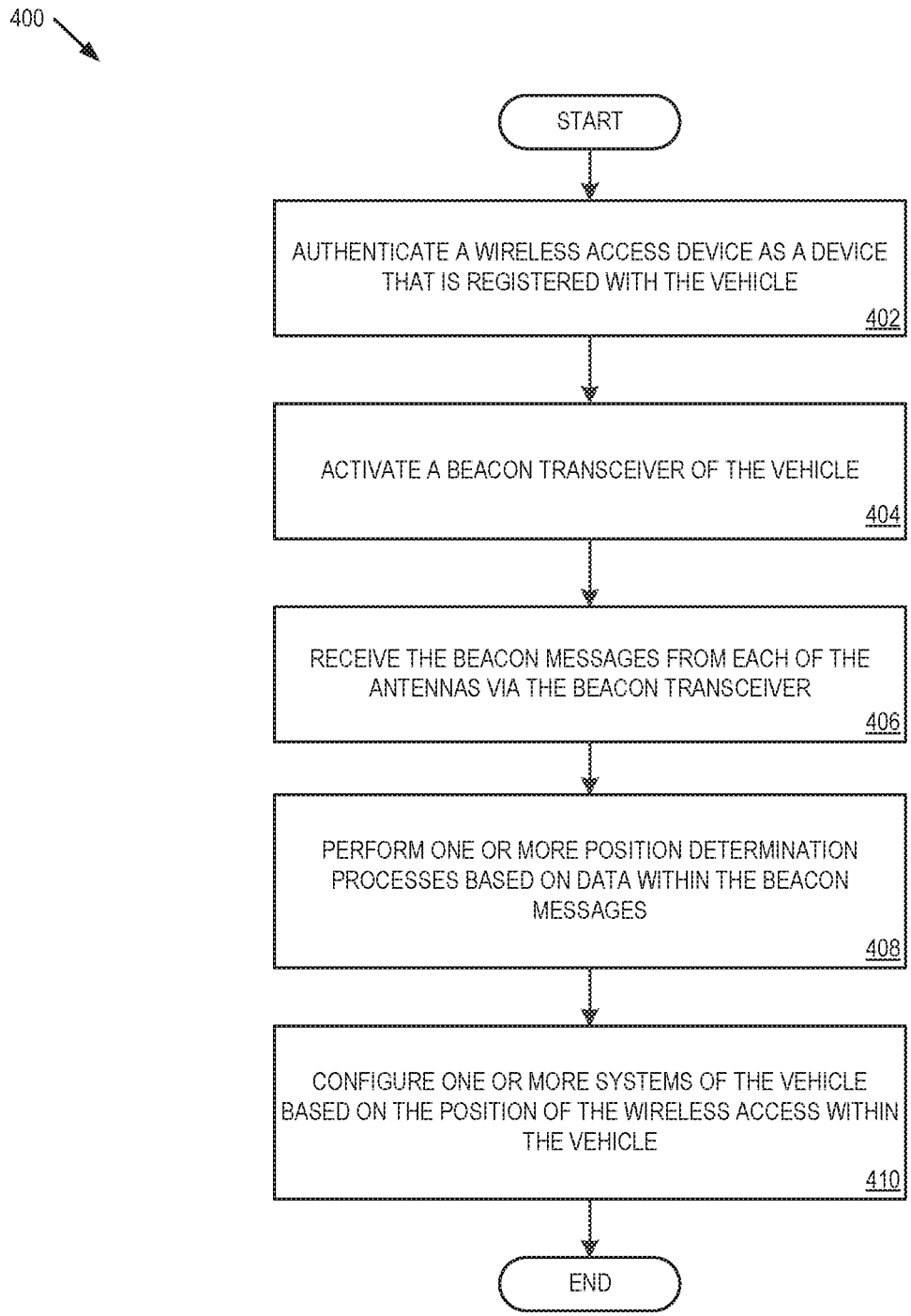
FIG. 4 is a flow diagram of one embodiment of a method for configuring one or more vehicle systems based on authentication and position of a wireless access device using beacon transceivers of a vehicle.

FIG. 4 is a flow diagram of one embodiment of a method 400 for configuring one or more vehicle systems based on authentication and position of a wireless access device using beacon transceivers of a vehicle. The method 400 is performed by processing logic that may comprise hardware (circuitry, dedicated logic, etc.), software (such as is run on a general purpose computer system or a dedicated machine), firmware, or a combination. In one embodiment, the method 400 is performed by a vehicle access manager (e.g., vehicle access manager 120 or 220 of vehicle 102 or 202).

Referring to FIG. 4, processing logic begins by authenticating a wireless access device as a device that is registered with vehicle 102 (processing block 402). In embodiments, the authentication performed by processing logic can include exchanging encryption keys, verifying one or more identifiers received from the wireless access device, negotiating parameters of a wireless connection (e.g., a Bluetooth, Bluetooth low energy, personal area network, wireless local area network, etc. connection), etc. Furthermore, in embodiments, the authentication may be initiated in response to a request received as a wireless message transmitted from the wireless access device, and received at a central transceiver of the vehicle.

Processing logic activates a transceiver (e.g., transceiver 117 of FIG. 1A) of the vehicle (processing block 404). The transceiver may remain in an inactive state until woken by the processing logic. Therefore, in response to successfully authenticating wireless access device, processing logic activates the transceiver, such as by causing the transceiver to transition to an active mode in which it is configured to receive beacon messages from antennas.

In embodiments, each antenna may receive the beacon message(s) transmitted by wireless access device as an analog signal(s), and measure signal data, such as signal strength, of the received beacon message. Each antenna may forward the beacon message including any additional data (e.g., measured signal strength upon reception) to the transceiver. The transceiver may convert the beacon message received from each antenna (as an analog signal) into a digital signal (using e.g., any appropriate analog to digital conversion method) and perform any appropriate additional signal processing before transmitting the (now digitized) beacon messages (with signal data) to the processing logic. As discussed herein, transceiver may switch between antennas and receive the beacon messages one by one from each respective antenna. In embodiments, transceiver may be a MIMO transceiver and may receive the beacon messages from each antenna simultaneously.

Processing logic receives the beacon messages from each of the antennas, via the transceiver (processing block 406).

Processing logic may then utilize the data within the beacon messages, (e.g., measured signal strength of each beacon message at the antenna it was received at), to perform one or more position determination processes (processing block 408). In embodiments, the position determination process can include, as discussed herein, determining which antennas measure the highest signal strength for determining which antennas the wireless access device is closest to, using trilateration based on received signal strengths, etc. Although discussed in terms of received signal strength at the antennas 116, as discussed herein, any one or more suitable physical parameters of the beacon messages such as time of flight, phase, angle of arrival, angle of departure, and polarization of the received beacon message may be used by the processing logic to determine the position of the wireless access device relative to the vehicle. Processing logic may perform certain position based functions for configuring the vehicle. For example, based on a relative position of wireless access device relative to the vehicle (e.g., rear, front, left front door, left back door, right front door, right rear door, charging port, etc.), a position based function may be executed by processing logic (e.g., unlocking a driver side door, opening a trunk, popping a charging port door, starting a vehicle ignition, authorizing driving, etc.).

Therefore, processing logic configures one or more systems of the vehicle based on the position of the wireless access device relative to the vehicle (processing block 410). In embodiments, additional information, such as an identifier of a user of the wireless access device may also assist processing logic in execution of the position based functions or vehicle configurations. For example, a first user having a first wireless access device may be associated with driving privileges for the vehicle, while a second user is associated with access but not operational privileges for the vehicle. Any combination of position based, user based, etc. factors may be used by processing logic when configuring the vehicle for the wireless access device based on its determined position relative to the vehicle.

Figure 5A:
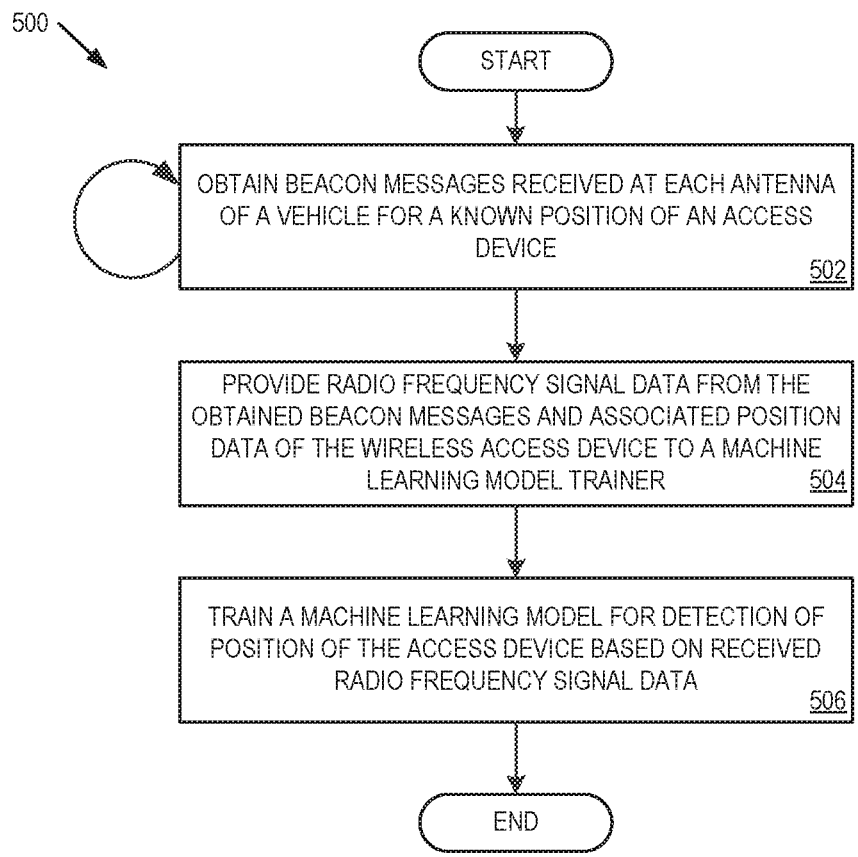
FIG. 5A is a flow diagram of one embodiment of a method for training a machine learning model.

FIG. 5A is a flow diagram of one embodiment of a method 500 for training a machine learning model for use in determining the position of a wireless access device relative to a vehicle. The method 500 is performed by processing logic that may comprise hardware (circuitry, dedicated logic, etc.), software (such as is run on a general purpose computer system or a dedicated machine), firmware, or a combination. In one embodiment, the method 500 is performed by a vehicle access manager (e.g., vehicle access manager 120 or 220 of vehicle 102 or 202). In embodiments, the method may be performed during vehicle manufacture and/or testing. In other embodiments, additional machine learning model training may be performed when a user provides feedback, such as a failed position result, in response to a detected and/or user confirmed discrepancy between a predicated position and actual position, etc.

Figure 5B:
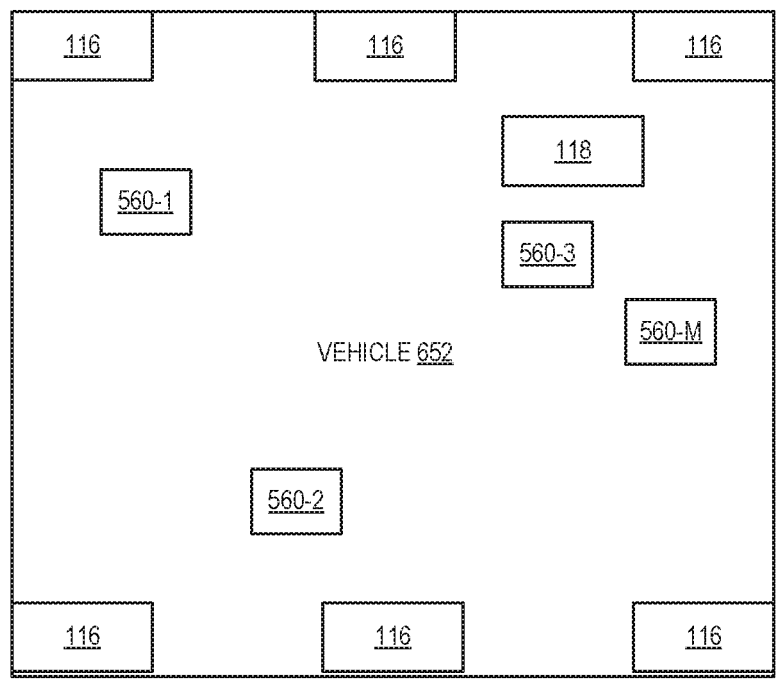
FIG. 5B is a block diagram illustrating the selective transmission of signals from subsets of beacon transceivers during radio frequency fingerprint generation.
Figure 6A:
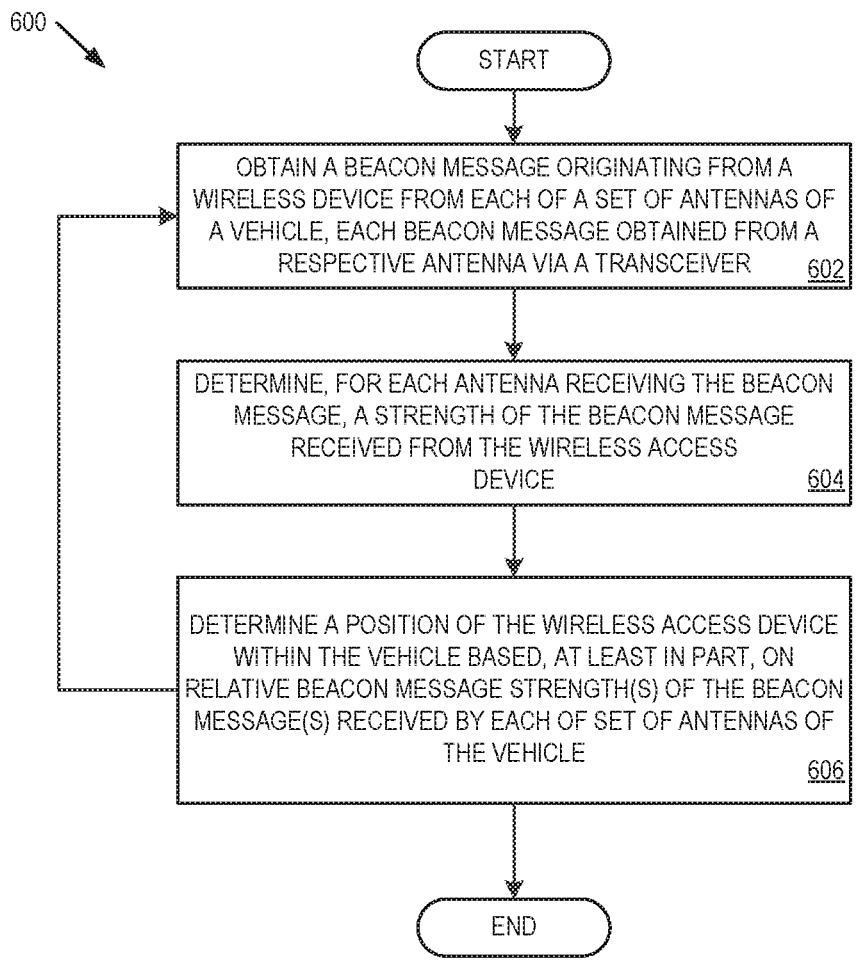
FIG. 6A is a flow diagram of one embodiment of a method for determining a position of a wireless access device relative to a vehicle.

Referring to FIG. 6A, processing logic begins by obtaining beacon messages received at each antenna of a vehicle for a known position of a wireless access device relative to the vehicle (processing block 502) based on the obtained beacon messages. In embodiments, the known position is a position from which the wireless access device is transmitting beacon messages. Furthermore, the obtaining of beacon messages is repeated a plurality of times at a plurality of known positions for generating a collection of MLM training data. For example, as illustrated in FIG. 5B, a wireless access device generates and transmits beacon messages from positions 560-1, 560-2, 560-3, 560-N, and 560-M, which are inside the vehicle. These positions are illustrative, as different and/or additional positions may be utilized for generation of the collection of MLM training data. Furthermore, the known positions may be communicated to processing logic in the beacon messages or by a secondary system (not shown), where the known positions are determined from a positioning system of the secondary system that is capable of accurately determining an absolute and/or relative position of wireless access device 560 to vehicle 552. For example, secondary system may be a robot or other automated system capable of reliably and accurately moving and providing a position of the wireless access device 560 relative to vehicle 552 over a large number of positions, the known positions determined from the high precision positioning process performed by the positioning system of the secondary system (such as assisted GPS based positioning, mechanical position measurements, etc), provide transmit position of a wireless access device as MLM training data to build a corpus of MLM training data.

Processing logic provides the radio frequency signal data, such as received signal strength measurements (e.g., RSSI measurements), from the obtained beacon messages and associated position data of the wireless access device, such as x, y, z positions tracked by a secondary relative to the vehicle, generated from a high precision positioning process, or other automated technique, to a machine learning model trainer (processing block 504). In embodiments, the trainer is a MLM trainer that iteratively feeds data from the generated collection of MLM training data to refine the MLM model for detection of access device position based on received radio frequency signal data (processing block 506). For example, a long short-term memory machine learning model may be trained by radio signal inputs and know positions to iteratively adjust and train the long short-term memory machine learning model to accurately generate an output associated with the known positions. In embodiments, the training data (e.g. RSSI measurements and associated wireless access device positions) may be stored in a database, and accessed by the MLM trainer during a training process. Additionally, real world training data, such as that updated to remote server(s) (e.g. server(s) 180) by vehicles, such as position determinations cross-checked with MLM based position determinations, may also be fed into the MLM during training and/or refinement. That is, other MLMs and training methods may be used to train the MLM using the generated collection of radio signal transmission data and associated known positions. For example, radio signal inputs and user approved discrepancy reports (e.g., predicted position of wireless access device relative to vehicle differs from user command received at a different position relative to the vehicle) may also be used to train/refine a MLM consistent with the discussion herein.

FIG. 6A is a flow diagram of one embodiment of a method 600 for determining a position of a wireless access device relative to a vehicle using a set of antennas within the vehicle and relative signal strengths of radio signals received by each antenna in the set. The method 600 is performed by processing logic that may comprise hardware (circuitry, dedicated logic, etc.), software (such as is run on a general purpose computer system or a dedicated machine), firmware, or a combination. In one embodiment, the method 600 is performed by a vehicle access manager (e.g., vehicle access manager 120 or 220 of vehicle 102 or 202). In embodiments, the method may be performed to determine a position of a wireless access device relative to a vehicle. Furthermore, in embodiments, the method may be performed as a cross-check against another position determination technique, such as a machine learning model based position determination technique.

Referring to FIG. 6A, processing logic begins by obtaining a beacon message originating from a wireless device from each of a set of antennas within the vehicle, each beacon message obtained from a respective antenna via a transceiver (processing block 602). In embodiments, the beacon message is transmitted by the wireless access device as discussed in greater detail above. In embodiments, the set of antennas receiving the beacon message can include all antennas of a vehicle, or only a certain number (e.g., one, two, or more) of the antennas. As discussed below, the relative signal strengths of the beacon message received by particular antennas enable processing logic to determine a position of the wireless access device relative to the vehicle.

For each antenna receiving the beacon message, processing logic determines a strength of the beacon message received from the wireless access device (processing block 604). Processing logic then determines a position of the wireless access device relative to the vehicle based, at least in part, on relative signal strengths of beacon messages received at each of the set of antennas of the vehicle (processing block 606). In embodiments, the relative signal strengths may be RSSI measurements, received signal power, etc.

Figure 6B:
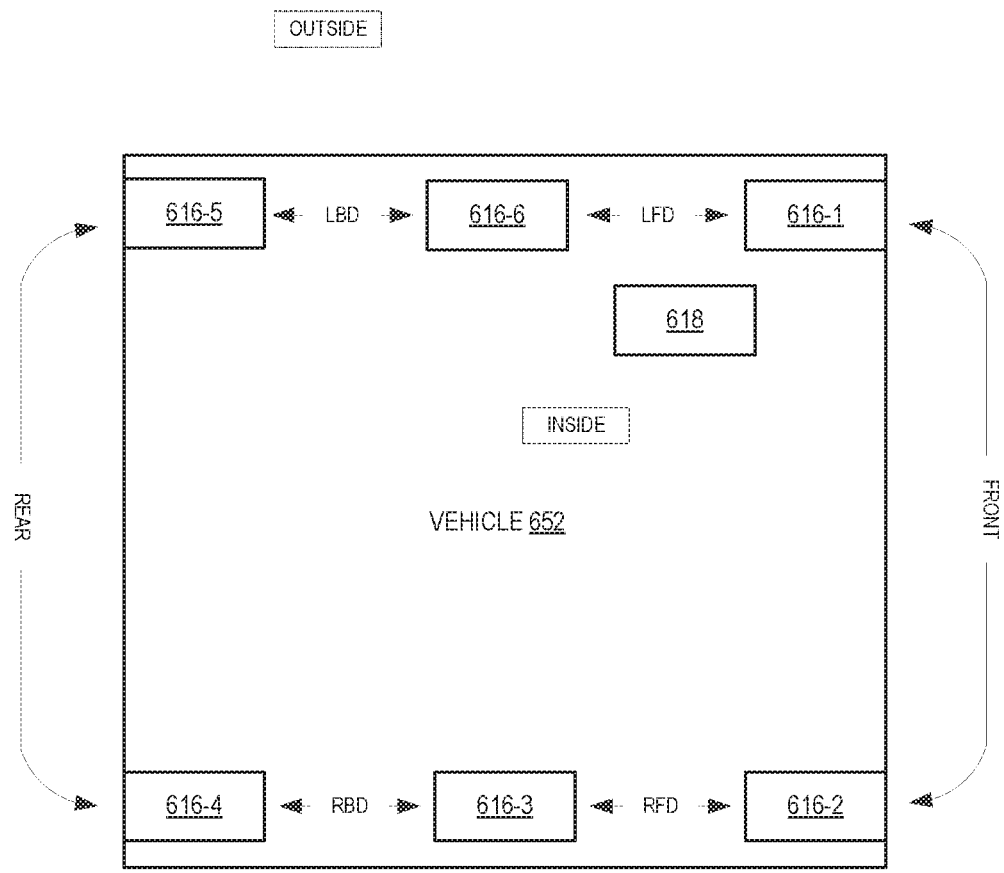
FIG. 6B is a block diagram illustrating a vehicle and a plurality of regions of the vehicle in which a wireless access device can be detected using relative signal strengths of signals generated by the wireless access device and received by subsets of beacon transceivers.

FIG. 6B is a block diagram illustrating a vehicle and a plurality of regions within the vehicle in which a wireless access device can be detected using relative signal strengths of signals generated by the wireless access device and received by antennas 616-1-616-6. As illustrated in FIG. 6B, vehicle 652 includes a plurality of regions, including but not limited to, inside, outside, front, rear, left front door, left back door, right front door, and right back door. In embodiments, processing logic of FIG. 6A at processing block 606 utilizes trilateration, triangulation, or multi-lateration or any other suitable technique as discussed herein to determine the position of the wireless access device relative to the vehicle. For example, when antennas 616-1 and 616-2 measure the strongest received signals relative to the other antennas, the processing logic is able to determine that a wireless access device's position is within signal transmission/reception range and is positioned in the front region relative to vehicle 652. The signals received at the other antennas 616-3-616-6 may be used to fine tune the determined position. For example, if antenna 616-3 measures the third strongest received signal, and antennas 616-4 and 616-5 measure the fourth and fifth strongest respectively (with antenna 616-6 measuring the least strong), then the processing logic may determine the position of the wireless device as position X, adjacent to the right front door (RFD) as indicated in FIG. 6B. Similarly, if the strongest signal is from transceiver 616-4 and the second strongest signal is from the transceiver 616-3, or similarly if the strongest signal is from transceiver 616-3 and the second strongest signal is from the transceiver 616-4, processing logic can determine the position of wireless access device as being in the relative position associated with the rear back door. In one embodiment, if the strongest signal is from transceiver 616-3, the second strongest signal is from the transceiver 616-4 and a third strongest signal is from transceiver 616-7, then again processing logic can determine the wireless access device's position in the area relative to vehicle associated with the rear back door.

The position determination technique discussed with respect to FIGS. 6A and 6B may be used in conjunction with other techniques (e.g., with a machine learning technique) as cross-checks against one another. Furthermore, the technique discussed with respect to FIGS. 6A and 6B may be relatively more computationally efficient, and may provide an initial position determination of a wireless access device that is confirmed and/or refined by another technique, such as a machine learning technique.

Those of skill would appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software as a computer program product, the functions may be stored on or transmitted over as one or more instructions or code on a non-transitory computer-readable medium. Computer-readable media can include both computer storage media and communication media including any medium that facilitates transfer of a computer program from one place to another. A storage media may be any available media that can be accessed by a computer. By way of example, and not limitation, such non-transitory computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a web site, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of non-transitory computer-readable media.

The previous description of the disclosed embodiments is provided to enable any person skilled in the art to make or use the methods, systems, and apparatus of the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. A method comprising:
   receiving, from a wireless access device, a beacon message at each of two or more antennas positioned within a vehicle, wherein a single transceiver processes the beacon message received at each of the two or more antennas for position determination of the wireless access device by a vehicle control unit (VCU);
   determining, based at least in part on the beacon message received at each of the two or more antennas, a position of the wireless access device relative to the vehicle using a machine learning model analysis of measured radio signal strengths of the beacon message at each of the two or more antennas; and
   configuring one or more systems of the vehicle based at least in part on the position of the wireless access device relative to the vehicle, and
   wherein the method further comprises:
   transmitting, from the vehicle to a remote server as training data, the determined position of the wireless access device relative to the vehicle with signal parameters associated with at least one beacon message received by the two or more antennas, wherein the remote server uses the training data received from the vehicle and training data received from other vehicles to refine the machine learning model;
   receiving an updated machine learning model from the remote server; and
   using the updated machine learning model to determine a new position of the wireless access device relative to the vehicle.

2. The method of claim 1, wherein an interior of the vehicle comprises a met of zones, each zone in the set of zones defined by one or more pathways between the two or more antennas.

3. The method of claim 2, wherein determining the position of the wireless access device relative to the vehicle further comprises:
   measuring a radio signal strength of the beacon message at each of the two or more antennas;
   determining relative radio signal strengths of the beacon message at each of the two or more antennas; and
   determining a zone among the set of zones that the wireless access device is located within based at least in part on the relative radio signal strengths of the beacon message at each of the two or more antennas and a position of each of the two or more antennas.

4. The method of claim 1, wherein determining the position of the wireless access device relative to the vehicle comprises:
   measuring a radio signal strength of the beacon message at each of the two or more antennas; and
   determining the position of the wireless access device relative to the vehicle using the machine learning model analysis of the measured radio signal strengths and a position of each of the two or more antennas in the vehicle.

5. The method of claim 1, wherein determining the position of the wireless access device relative to the vehicle further comprises:
   measuring a radio signal strength of the beacon message at each of the two or more antennas; and
   determining the position of the wireless access device relative to the vehicle using a trilateration analysis of the measured radio signal strengths and a position of each of the two or more antennas in the vehicle.

6. The method of claim 1, wherein the one or more systems of the vehicle include driving systems, entertainment systems, doors, windows and seats.

7. The method of claim 1, wherein the machine learning model is a trained long short-term memory network.

8. A system comprising:
   two or more antennas positioned within a vehicle, each of the two or more antennas configured to receive a beacon message from a wireless access device;
   a transceiver communicably coupled with the two or more antennas, the transceiver configured to process the beacon message received at each of the two or more antennas for use in position determination of the wireless access device; and
   a processor communicably coupled with the transceiver, the processor configured to:
   determine, based at least in part on the beacon message received at each of the two or more antennas, a position of a wireless access device relative to the vehicle using a machine learning model analysis of measured radio signal strengths of the beacon message at each of the two or more antennas; and
   configure one or more systems of the vehicle based at least in part on the position of the wireless access device relative to the vehicle, and
   wherein the processor is further configured to:
   transmit, from the vehicle to a remote server as training data, the determined position of the wireless access device relative to the vehicle with signal parameters associated with at least one beacon message received by the two or more antennas, wherein the remote server uses the training data received from the vehicle and training data received from other vehicles to refine the machine learning model;
   receive an updated machine learning model from the remote server; and
   use the updated machine learning model to determine a new position of the wireless access device relative to the vehicle.

9. The system of claim 8, wherein an interior of the vehicle comprises a set of zones, each zone in the set of zones defined by one or more pathways between the two or more antennas.

10. The system of claim 9, wherein to determine the position of the wireless access device relative to the vehicle, the processor is further configured to:

measure a radio signal strength of the beacon message at each of the two or more antennas;
determine relative radio signal strengths of the beacon message at each of the two or more antennas; and
determine a zone among the set of zones that the wireless access device is located within based at least in part on the relative radio signal strengths of the beacon message at each of the two or more antennas and a position of each of the two or more antennas.

11. The system of claim 8, wherein to determine the position of the wireless access device relative to the vehicle, the processor is configured to:
measure a radio signal strength of the beacon message at each of the two or more antennas; and
determine the position of the wireless access device relative to the vehicle using the machine learning model analysis of the measured radio signal strengths and a position of each of the two or more antennas in the vehicle.

12. The system of claim 8, wherein to determine the position of the wireless access device relative to the vehicle, the processor is further configured to:
measure a radio signal strength of the beacon message at each of the two or more antennas; and
determine the position of the wireless access device relative to the vehicle using a trilateration analysis of the measured radio signal strengths and a position of each of the plurality of beacon transceivers on the vehicle.

13. The system of claim 8, wherein the one or more systems of the vehicle include driving systems, entertainment systems, doors, windows and seats.

14. The system of claim 8, wherein the machine learning model is a trained long short-term memory network.

15. A non-transitory computer readable storage medium including instructions that, when executed by one or more processors causes the one or more processors to:
transmit, to a wireless access device, a signal causing the wireless access device to transmit a beacon message to each of two or more antennas positioned within a vehicle;
determine, using the one or more processors, a position of the wireless access device relative to the vehicle based at least in part on the beacon message received at each of the two or more antennas, wherein the beacon message received at each of the two or more antennas is processed for use by the one or more processors by a single transceiver using a machine learning model analysis of measured radio signal strengths of the beacon message at each of the two or more antennas; and
configure one or more systems of the vehicle based at least in part on the position of the wireless access device relative to the vehicle, and
wherein the instructions, when executed by the one or more processors, further cause the one or more processors to:
transmit, from the vehicle to a remote server as training data, the determined position of the wireless access device relative to the vehicle with signal parameters associated with at least one beacon message received by the two or more antennas, wherein the remote server uses the training data received from the vehicle and training data received from other vehicles to refine the machine learning model;
receive an updated machine learning model from the remote server; and
use the updated machine learning model to determine a new position of the wireless access device relative to the vehicle.

16. The non-transitory computer readable storage medium of claim 15, wherein to determine the position of the wireless access device relative to the vehicle, the processor is to:
measure a radio signal strength of the beacon message at each of the two or more antennas; and
determine the position of the wireless access device relative to the vehicle using the machine learning model analysis of the measured radio signal strengths and a position of each of the two or more antennas in the vehicle.

17. The non-transitory computer readable storage medium of claim 15, wherein to determine the position of the wireless access device relative to the vehicle, the processor is to further:
measure a radio signal strength of the beacon message at each of the two or more antennas; and
determine the position of the wireless access device relative to the vehicle using a trilateration analysis of the measured radio signal strengths and a position of each of the two or more antennas in the vehicle.

18. The non-transitory computer readable storage medium of claim 15, wherein the one or more systems of the vehicle include driving systems, entertainment systems, doors, windows and seats.

* * * * *